United States Patent
Palmowski et al.

(10) Patent No.: US 6,176,155 B1
(45) Date of Patent: Jan. 23, 2001

(54) SEMI-AUTOMATIC WIRE PROCESSING APPARATUS

(75) Inventors: David Palmowski, Syracuse; Thomas S. Carpenter, Cazenovia, both of NY (US)

(73) Assignee: Schleuniger Holding AG (CH)

( * ) Notice: Under 35 U.S.C. 154(b), the term of this patent shall be extended for 0 days.

(21) Appl. No.: 09/157,073

(22) Filed: Sep. 18, 1998

(51) Int. Cl.⁷ ........................................ H02G 1/12
(52) U.S. Cl. ................................ 81/9.51; 29/825
(58) Field of Search ................... 81/9.51, 9.44, 81/9.42

(56) References Cited

U.S. PATENT DOCUMENTS

| | | |
|---|---|---|
| 1,666,277 | 4/1928 | White . |
| 2,645,959 | 7/1953 | Fuchs et al. . |
| 2,671,363 | 3/1954 | Wells ..................................... 81/9.51 |
| 2,880,635 | 4/1959 | Harris . |
| 3,176,550 | 4/1965 | Marcotte . |
| 3,222,957 | 12/1965 | Kramer et al. . |
| 3,376,627 | 4/1968 | Sitz . |

(List continued on next page.)

FOREIGN PATENT DOCUMENTS

| | | |
|---|---|---|
| 815/85 | 2/1985 | (CH) . |
| 683472 | 3/1994 | (CH) . |
| 1024598 | 2/1958 | (DE) . |
| 28 17 727 | 1/1981 | (DE) . |
| 0352038 | 1/1990 | (EP) . |
| 77 34574 | 11/1977 | (FR) . |
| 2038108 | 7/1980 | (GB) . |
| 97672 | 2/1947 | (JP) . |
| 54-17395 | 5/1953 | (JP) . |
| 45-1693 | 1/1970 | (JP) . |
| 46-6682 | 12/1971 | (JP) . |
| 144384 | 4/1976 | (JP) . |
| 52-150581 | of 1977 | (JP) . |
| 54-33103 | 10/1979 | (JP) . |
| 1069050 | 1/1984 | (SU) ..................................... 81/9.51 |

OTHER PUBLICATIONS

Author: Western Electronic Products Co. Title: Coaxial Cable Stripper Catalogue.
Author: Burns Equipment Company Title: Rotary Wire Stripper Catalogue.
Author: AMP Incorporated Title: AMP Customer Manual.
PCT–International Search Report dated Jan. 12, 2000.

*Primary Examiner*—David A. Scherbel
*Assistant Examiner*—Daniel G. Shanley
(74) *Attorney, Agent, or Firm*—Ostrolenk, Faber, Gerb & Soffen, LLP

(57) ABSTRACT

Wire processing apparatus particularly adapted to perform operations on wires having a central conductor with multiple, coaxial covering layers. The apparatus includes an electronic memory for storing values commensurate with the lengths from a terminal end of the wire to the positions of cuts to be made through the plurality of coating layers, and a plurality of threaded shafts individually movable by manual manipulation of mechanical elements to control the depths of each cut. The threaded shafts are mounted upon a turret which is movable both rotationally and axially with respect to the wire being processed. The electronic memory is preferably adapted to receive inputs representing parameters of sequential steps in each of two processing operations, and to perform such operations alternately, upon different wire ends, upon successive actuations of the apparatus. A further feature of the apparatus is an arrangement permitting the force exerted on the wire by a pair of gripping members to remain substantially constant over a range of different wire diameters. A stepper motor is mechanically linked to the gripping members and is indexed from a fixed starting position by a selectively variable number of steps to bring the gripping members to the wire-engaging position.

25 Claims, 10 Drawing Sheets

U.S. PATENT DOCUMENTS

| | | |
|---|---|---|
| 3,838,612 | 10/1974 | Inami . |
| 3,881,374 | 5/1975 | Gudmestad . |
| 3,921,472 | 11/1975 | Gudmestad et al. . |
| 3,951,016 | 4/1976 | Gudmestad et al. . |
| 4,027,557 | 6/1977 | Stepan . |
| 4,091,695 | 5/1978 | Funcik et al. . |
| 4,261,230 | 4/1981 | Sindelar . |
| 4,345,362 | 8/1982 | de Givry . |
| 4,546,675 | 10/1985 | Okada et al. . |
| 4,580,225 | 4/1986 | Thompson . |
| 4,601,093 | 7/1986 | Cope . |
| 4,745,828 | 5/1988 | Stepan . |
| 4,838,129 | 6/1989 | Cope . |
| 4,920,830 | 5/1990 | Stepan . |
| 4,981,054 | 1/1991 | Stepan . |
| 4,993,147 | 2/1991 | Carpenter et al. . |
| 5,111,720 | 5/1992 | Stepan ................................. 81/9.51 |
| 5,243,882 | 9/1993 | Stepan . |
| 5,585,519 | 12/1996 | Jaffe et al. . |

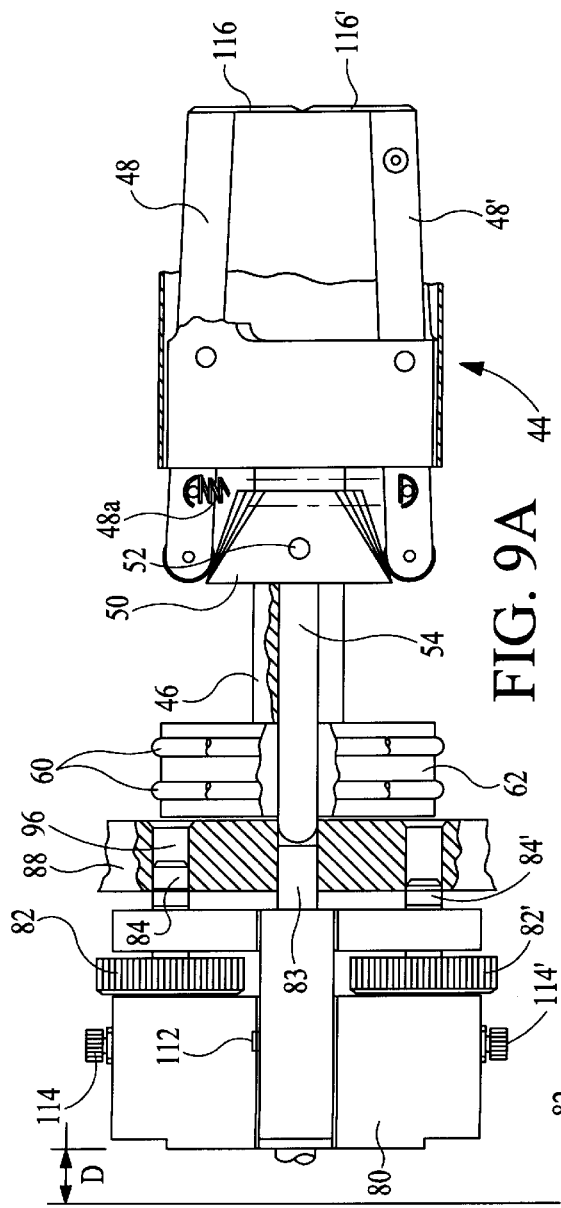
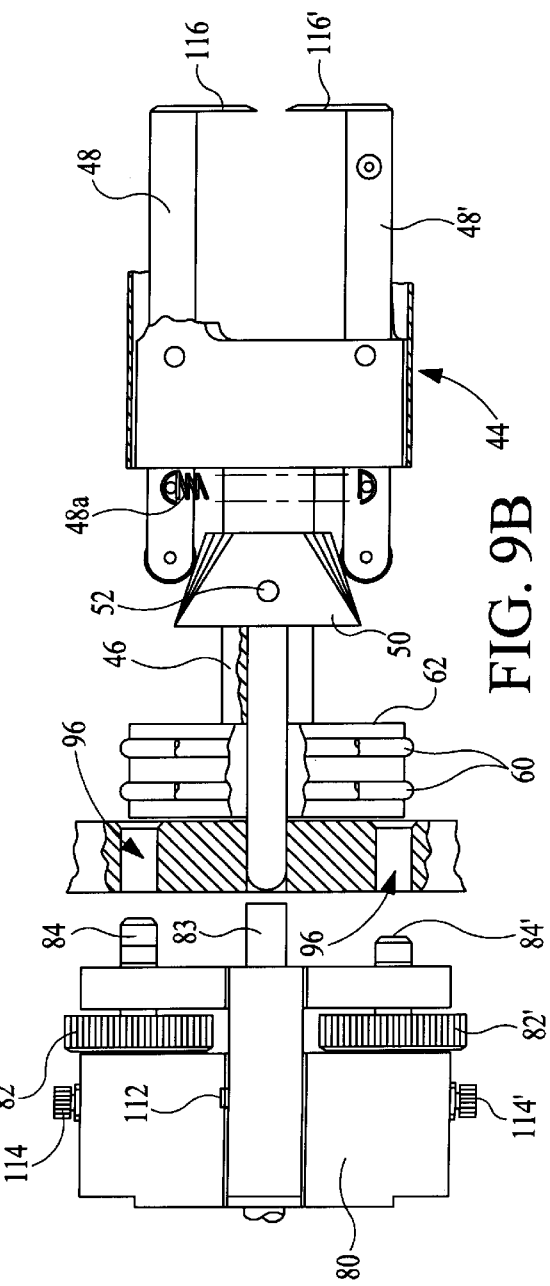
FIG. 9A
FIG. 9B

SEMI-AUTOMATIC WIRE PROCESSING APPARATUS

BACKGROUND OF THE INVENTION

The present invention relates to so-called wire processing apparatus wherein a coated, filamentary member, such as an electrical wire or optical fiber, is clamped in a fixed position while blade means sever the coating layer(s) and strip the severed slug(s) from the member. In a preferred form, the apparatus of the invention is operable to successively sever and strip a plurality of coating layers from the filamentary member. Although it will be understood that the present invention, and related prior art equipment, may be used with many types of filamentary workpieces, for simplicity of discussion the workpiece will be considered an electrical cable having a central core and a plurality of coating or covering layers of electrical insulation, magnetic shielding, and the like, i.e., such as a coaxial cable, and will be referred to as a "wire" throughout the following written description.

A wide variety of equipment has been devised for the purpose of severing and stripping coating layers from coaxial cables, and other wires with a plurality of coating layers. Such equipment may be constructed for entirely manual operation, fully automated operation, or some combination of the two. Examples of fully automated cutting/stripping machines may be found in U.S. Pat. Nos. 5,111,720, 5,243,882, and others, wherein values representing a plurality of lengths (from the end of the cable to the longitudinal position of the cut) and radial depths of successive cuts, each through a different covering layer, may be entered via a keypad and stored in electronic memory. Upon actuation, the equipment proceeds automatically to make successive cuts through the covering layers at the lengths and depths stored in memory.

It is a principal object of the present invention to provide apparatus for successively cutting through a plurality of layers of a coaxial cable at different lengths and depths with some settings entered by an operator and stored in a purely mechanical manner with other settings entered and stored electronically. That is, the principal object of the invention is to provide novel and improved hybrid or semi-automatic apparatus for cutting through a plurality of covering layers at various lengths and depths of cuts.

Another object is to provide apparatus for gripping a wire with a substantially constant force over a range of wire diameters as cutting and stripping of covering layers is performed.

A further object is to provide wire processing apparatus with means for storing two sets of values relating to lengths of cuts and/or other variables and for performing functions commensurate with each set of values alternately on two different wire ends.

Still another object is to provide novel and improved means for mechanically storing a plurality of radial depths of cuts to be made in covering layers of a coaxial cable and for implementing successive cuts at the mechanically stored depths.

Other objects will in part be obvious and will in part appear hereinafter.

SUMMARY OF THE INVENTION

The wire processing apparatus of the invention includes a pair of reciprocating gripping jaws which are initially separated for axial insertion therebetween of a coaxial cable, or the like. After the apparatus has been initialized, as described later, the cable is inserted until its terminal end contacts blade means which subsequently effect the cutting operation. The jaws are then pivoted toward a closed position by operation of a linear actuator to move a wedge to rotate the jaws until they grip the cable. The actuator is programmed to move the wedge, and thereby move the jaws, by a distance commensurate with the diameter of the wire being clamped. That is, the distance of movement of the actuator is variable in accordance with the wire diameter to ensure that the gripping force is sufficient to prevent movement of the cable as axial forces are exerted thereon while avoiding excessive gripping forces.

The apparatus includes a pair of blades having cutting edges movable toward and away from one another to effect cutting through the covering layers on the cable. The blades are initially in a closed position, i.e., the cutting edges of the blades are substantially in mutual contact, and serve as a stop means for contact by the end of the cable to establish the limit of axial insertion thereof. Arms carrying the blades are then pivoted to rotate the blades to an open position, i.e., to separate the cutting edges, and the cutting mechanism, including the blades, is moved axially of the cable to position the blades adjacent the axial portion of the cable where the first cut is to be made. The distance of axial movement of the blades, i.e., the "length of cut," is controlled by a stepper motor acting on a lead screw to move a carriage upon which the cutting means are mounted. Electrical signals provided to the stepper motor for establishing the lengths of each of a plurality of successive cuts are controlled by an electronic memory which stores values entered by an operator via a keypad on the apparatus, in conventional manner.

The depth of a cut, i.e., the distance of radial movement of the blades toward the axis of the cable, is determined by the axial position of a stop member which physically contacts and axially moves a conical cam member to effect radial movement of the blades. A rotatable turret is fitted with a plurality of threaded shafts and a fixed shaft. All of the shafts have axes parallel to the axis of rotation of the turret and are spaced equally therefrom. The threaded shafts are engaged in respective nuts which are manually rotatable for reciprocal, axial movement of the shafts, thereby providing individual, selective positioning of the terminal end of each shaft. The turret is indexed by a linear actuator between four rotational positions. The terminal end of a different one of the four shafts (three selectively, axially movable, one fixed) is positioned in alignment with the member which effects radial movement of the blades in each of the four turret positions. The turret is mounted on a carriage which is movable in a direction parallel to the axes of the shafts. The carriage moves a fixed distance, between predetermined rear and forward positions, upon each actuation. Thus, the extent of radial movement of the blades (depth of cut) is controlled by the position of the end of the shaft in alignment with the cam member. The turret is rotatably indexed after each cut is completed to position the end of a different shaft in alignment with the cam member, the fixed shaft always being in this position, with the carriage in its forward position, at the beginning of each cycle to establish the initialized (fully closed) position of the blades. The nuts which adjust the axial positions of the threaded shafts to establish the desired depths of cuts are manually accessible through an opening in the top of the apparatus housing.

A unique keypad is provided for entry by an operator of values and control functions. Among other features, the keypad permits entry of a first plurality of cutting and/or strip lengths for sequentially severing and fully or partially removing a plurality of coating layers on one end of a wire, and a second plurality of values for sequential cutting/stripping operations on the other end of the wire. Of course, the wire is removed from the clamping means, reversed end-for-end and replaced in the clamping means between the first and second sequence of operations.

The foregoing and other features of construction and operation of the invention will be more readily understood and fully appreciated from the following detailed disclosure, taken in conjunction with the following detailed description and accompanying drawings.

BRIEF DESCRIPTION OF THE DRAWINGS

FIGS. 9A and 9B are plan views of the element of FIG. 8, together with other elements, in two positions of relative movement.

DETAILED DESCRIPTION

Figure 1:
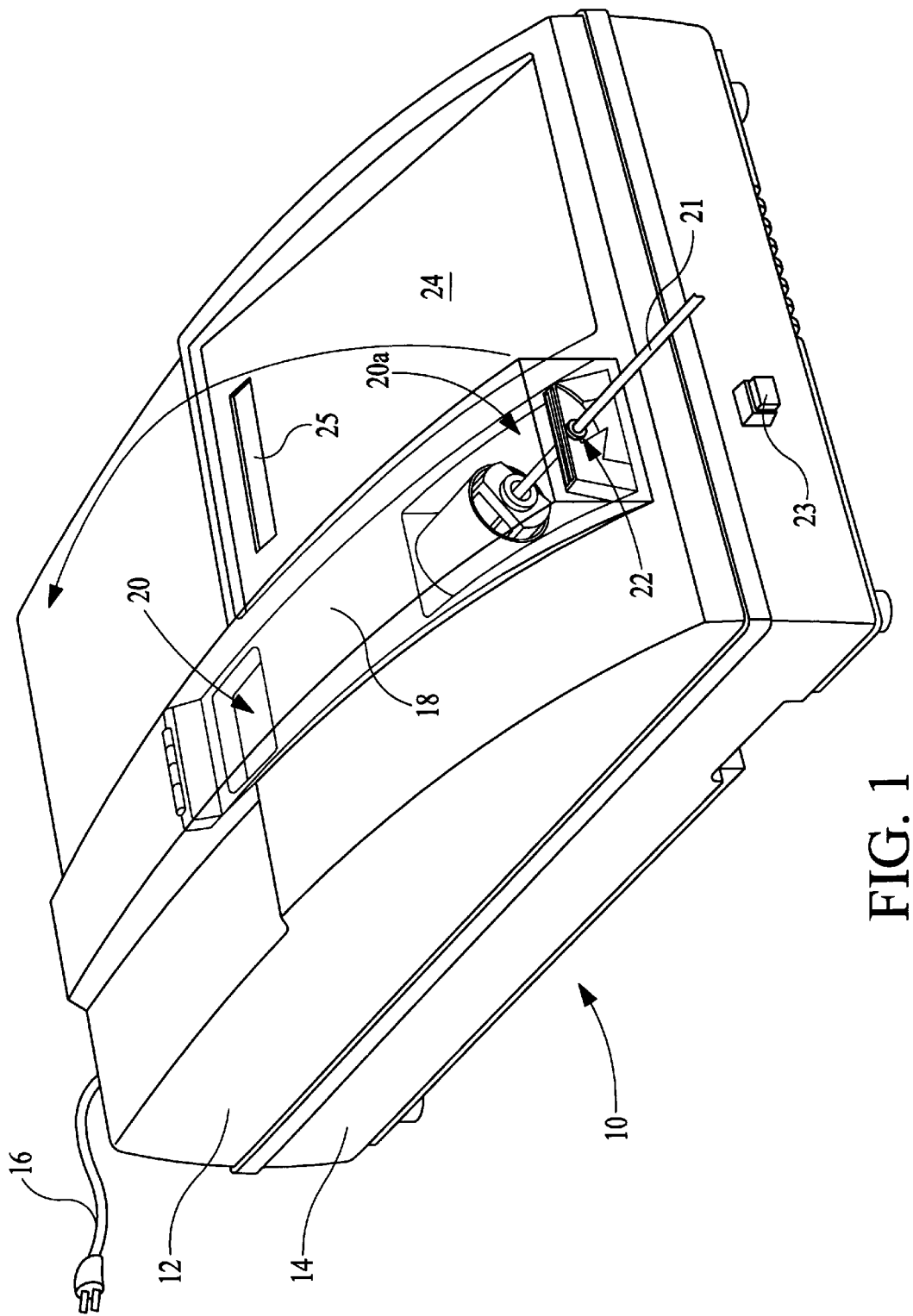
FIG. 1 is a perspective view of a housing for apparatus embodying the invention.

Referring now to the drawings, an example of apparatus for processing elongated, filamentary members such as coaxial cable is seen in FIG. 1, denoted generally by reference numeral 10. Apparatus 10 includes an external housing having upper and lower sections 12 and 14, respectively, wherein both mechanical and electrical components are housed. Power cord 16, for connection to an appropriate AC source, extends from the housing. Transparent safety shield 18 is hingedly attached to upper housing section 12 for movement between covering and uncovering positions with respect to openings 20 and 20a. A workpiece such as wire 21 extends through opening 22 in shield 18 when the latter is in the covering position as covering layer(s) on the cable are cut and, if desired, stripped from the cable. Actuation or cycling button 23 is provided on the front surface of lower section 14. Keypad 24 and display window 25, described later in more detail, are provided on the top surface of upper housing section 12 for entering values to be stored in an electronic memory within the housing, and for effecting other control functions.

Figure 2:
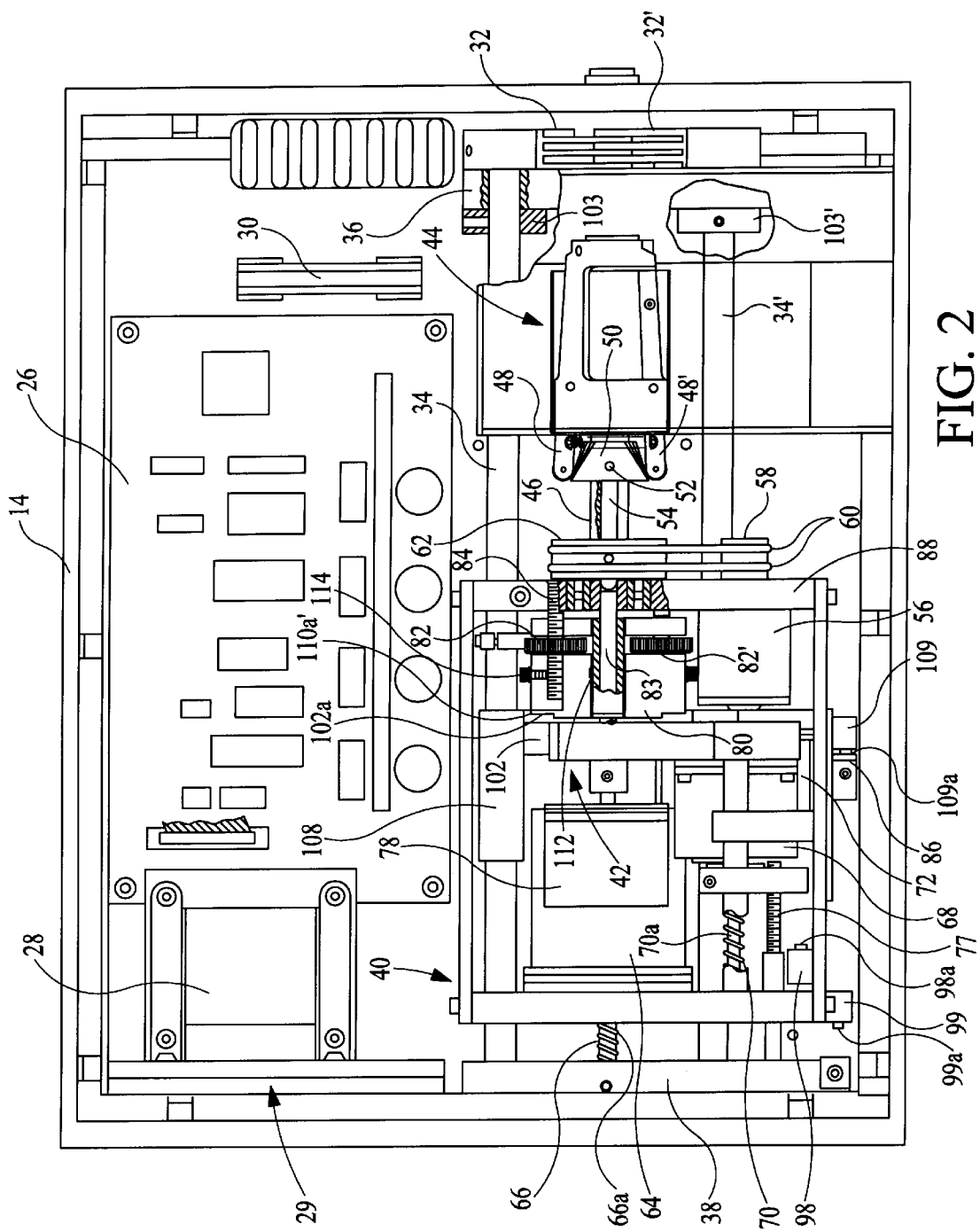
FIG. 2 is a plan view of the apparatus of FIG. 1 with the housing cover removed.
Figure 3:
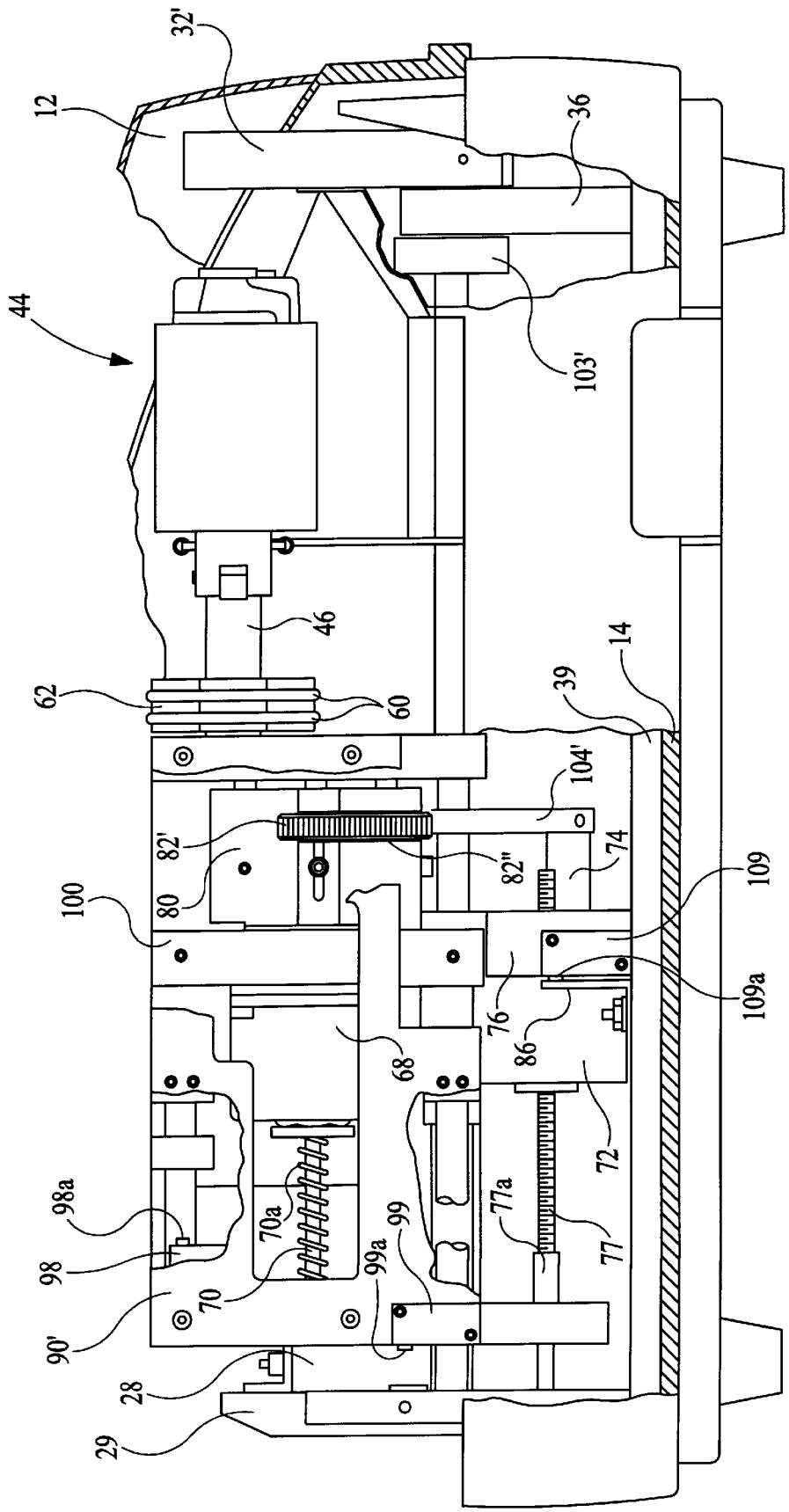
FIG. 3 is a side elevational view of the apparatus of FIG. 2.

Components housed within lower section 14 are shown in plan view in FIG. 2 and in side view in FIG. 3. Circuit board 26, transformer 28 and fan 30 are contained in the upper (as viewed from the top in FIG. 2) part of section 14, transformer 28 being secured to plate 29. An additional circuit board (not shown) is preferably mounted on the lower surface of upper housing section 12, directly under keypad 24. A pair of gripper members 32, 32' are mounted at what is termed the forward side of apparatus 10, i.e., the right side as viewed in FIG. 2, upon the ends of rods 34, 34', respectively. Rods 34, 34' are rotatably supported in forward and rear end plates 36 and 38, respectively, of a fixed frame within lower housing section 14. Outer carriage 40 and inner carriage 42 are each mounted for reciprocal movement toward the forward and rear sides of the apparatus. As explained later, inner carriage 42 moves together with outer carriage 40, but is also movable with respect thereto.

Cutting mechanism, indicated generally by reference numeral 44, is mounted rearwardly of gripper members 32, 32' upon hollow shaft 46 which is rotatably mounted upon outer carriage 40. Cutting mechanism 44 includes a pair of blades having opposed cutting edges and mounted upon the forward ends of respective, pivotally mounted arms 48, 48'. Rollers carried at the rear ends of arms 48, 48' are spring biased into contact with the surface of member 50, essentially flat on the top and bottom and tapered on the sides, which is slidably mounted upon hollow shaft 46 for axial movement relative to arms 48, 48'. Member 50 is connected by pin 52, extending through elongated slots in hollow shaft 46, to rod 54 which is positioned within hollow shaft 46. Axial movement of rod 54 moves member 50 to rotate arms 48, 48' and effect movement of the blades toward and away from one another. Member 50 is shown in FIG. 2 in its forwardmost position, wherein the blades are fully closed with their cutting edges in mutual contact. Construction and operation of cutting mechanism 44 is entirely conventional, corresponding essentially to that disclosed in U.S. Pat. No. 4,993,147, incorporated by reference herein, although further details relating conventional portions of the cutting mechanism to novel elements of the present invention appear hereinafter.

Movement of various elements of apparatus 10 is effected by one electric motor and four linear actuators, also known as stepper motors. Electric motor 56 is mounted upon outer carriage 40 for rotation of pulley 58, connected by belts 60 to pulley 62 for rotation of cutter mechanism 44. Stepper motor 64 is mounted upon outer carriage 40 and operates upon axially stationary lead screw 66 to effect reciprocating movement of the outer carriage. Stepper motor 68 is mounted upon inner carriage 42 and operates upon lead screw 70 to effect reciprocating movement of the inner carriage relative to outer carriage 40. Stepper motor 72 and wedge 74 are fixedly mounted upon frame member 76 which is slidably mounted on rods 34, 34'; operation of motor 72 acts upon lead screw 77 to move wedge 74 in forward and rear directions to operate gripper jaws 32, 32', as described later. Stepper motor 78 is mounted on inner carriage 42 and has an output shaft connected to rotatable turret 80 to index the latter between four positions, as also described later in more detail. Turret 80 carries fixed shaft 83 and three nuts 82, 82', 82", each engaging a respective threaded shaft, one of which, indicated by reference numeral 84, may be seen in FIG. 2, the other two being shown in later Figures. Additional reference numerals, denoting elements described later, also appear in FIGS. 2 and 3.

Figure 4:
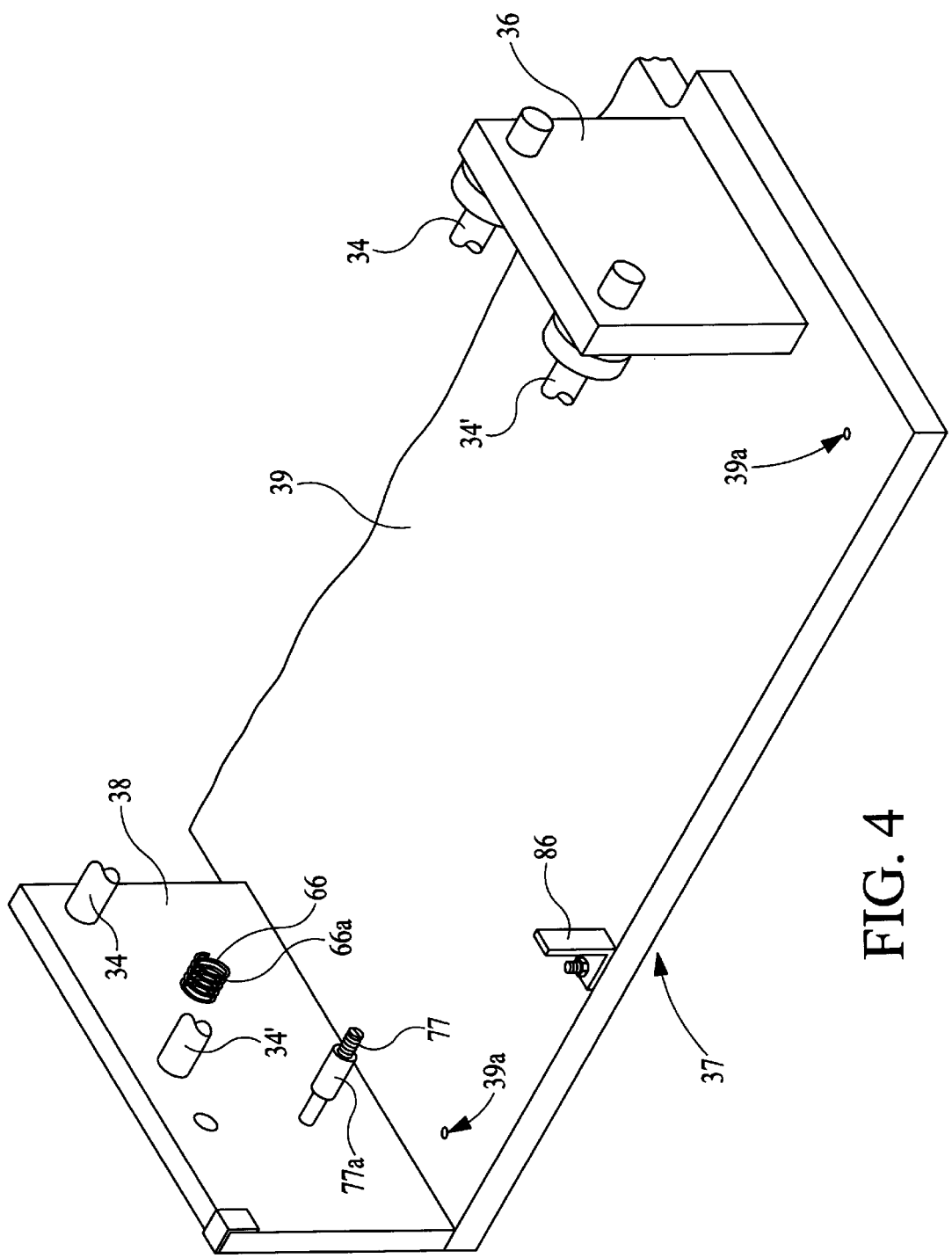
FIGS. 4 through 7 are fragmentary, perspective views, some exploded and some partly in section, of various portions of the apparatus.

Having thus generally described various components in fully assembled condition, attention is now directed to FIGS. 4, et seq., where further details of construction and operation of these and other components will be more readily apparent. Fixed frame 37, shown separately in FIG. 4, is provided by base plate 39 with rigidly affixed, vertically disposed end plates 36 and 38. Frame 37 is affixed to the lower wall of housing section 14 by bolts passing through openings 39a in base plate 39. L-shaped bracket 86 is affixed to base plate 39, and rotatable shafts 34, 34' are mounted in bearings in end plates 36 and 38, as previously mentioned. Lead screws 66 and 77 are each rotatably mounted at one end upon, and extend from, end plate 38. It will be noted that lead screw 77 forms one portion of a rod having a smooth, cylindrical portion 77a which, as described later, extends slidably through an opening in a wall of outer carriage 40.

Figure 5:
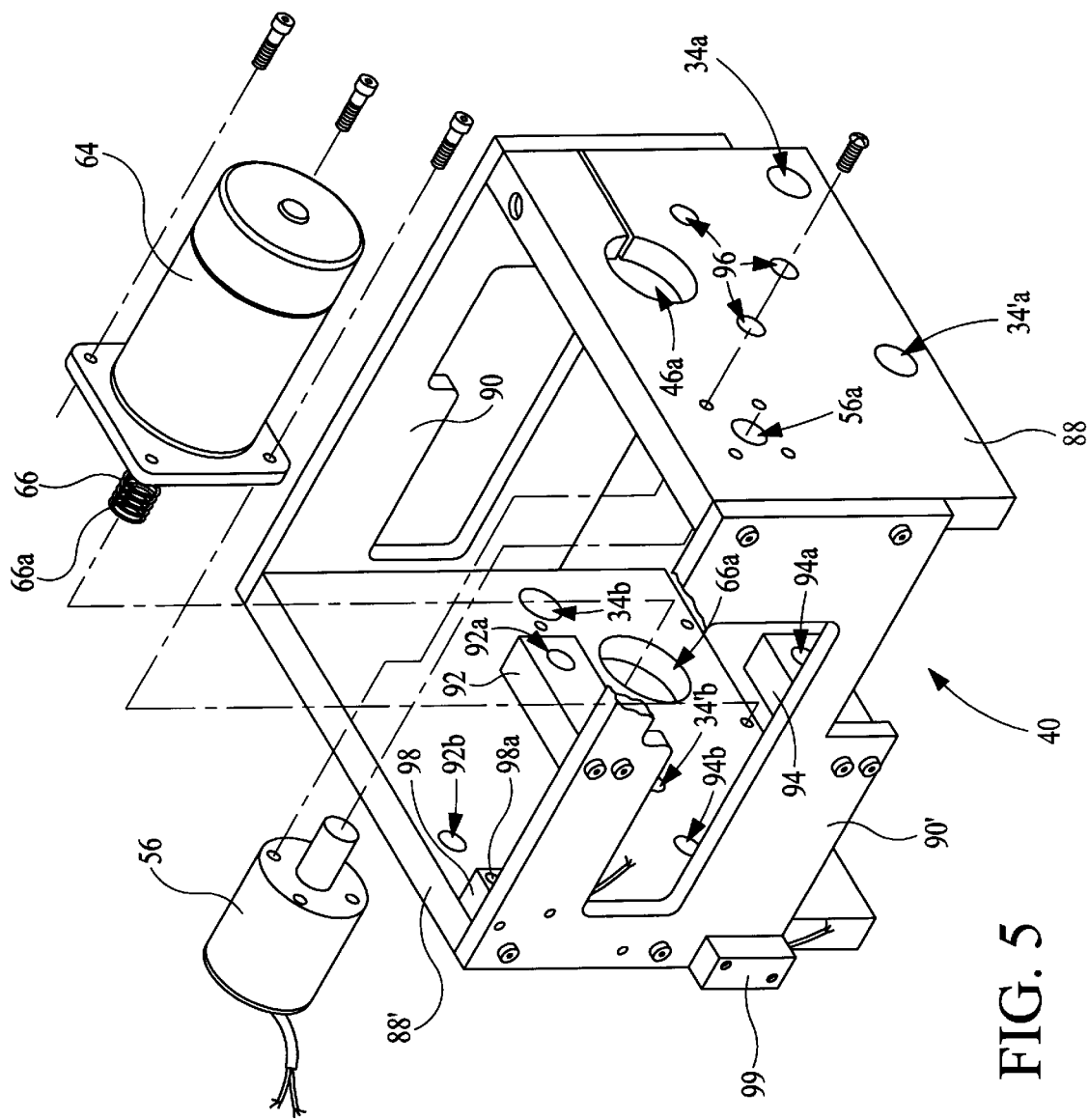

Turning now to FIG. 5, outer carriage 40 is seen to comprise four rigidly connected walls, namely, front and back walls 88 and 88', respectively, and side walls 90, 90'. Blocks 92 and 94, having respective openings 92*a* and 94*a*, are affixed to and extend inwardly from the inside surface of side wall 90'. Motor 56 and stepper motor 64 are shown exploded away from their fixed mountings upon the inner surfaces of front and back walls 88 and 88', respectively. The following through openings are provided in front plate 88: opening 46*a* for bearings 46*b* (FIG. 6) in which shaft 46 of the cutting mechanism is journaled, openings 34*a*, 34'*a* for rods 34, 34', opening 56*a* for the shaft of motor 56 and surrounding small openings for screws to attach the motor to wall 88, and openings 96 to provide clearance for the forward ends of three of the four shafts on turret 80 which are aligned with openings 96 when the turret is moved, with inner carriage 42, from its rear to its forward position. Through openings 34*b*, 34'*b*, 66*a*, 92*b* and 94*b* are provided in rear wall 88'. Limit switch 98, having forwardly disposed contact button 98 *a* is fixedly mounted at the upper portion of the inside junction of walls 88' and 90'. Limit switch 99, having rearwardly disposed contact button 99*a* (FIGS. 2 and 3) is affixed to the lower rear corner of the outer surface of side plate 90'.

Figure 6:
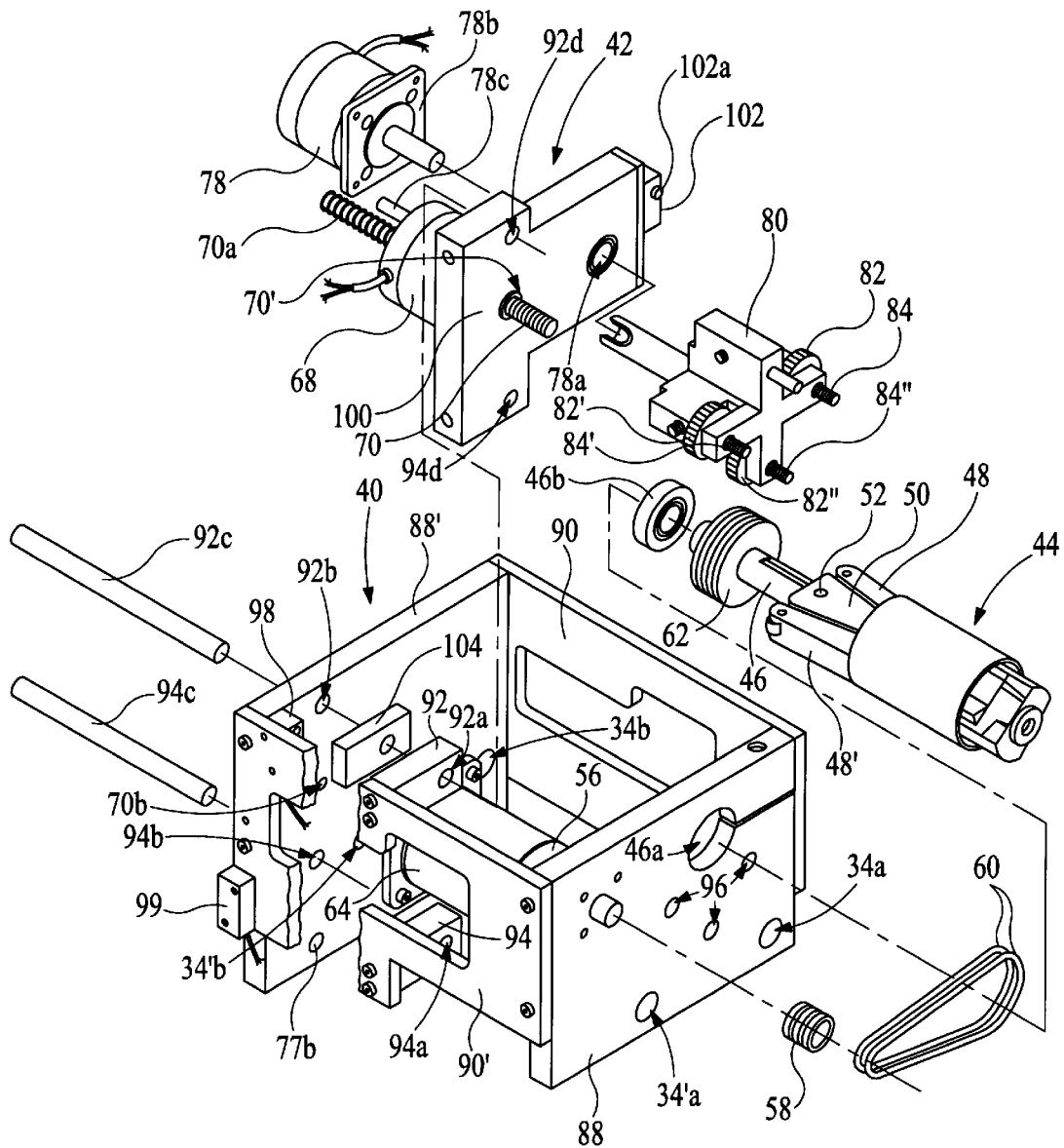

In FIG. 6, outer carriage 40 is shown in combination with inner carriage 42 and portions of cutter mechanism 44 and turret 80 carried thereon. Inner carriage 42 is seen to consist of an essentially T-shaped plate 100; stepper motor 68 is mounted on the rear surface and limit switch 102, having forwardly disposed contact button 102*a*, is mounted on a side surface of plate 100. The shafts of stepper motor 78 and turret 80 extend through opening 78*a* in plate 100 and are connected to one another for rotational indexing of the turret by the motor. Flange 78*b* of stepper motor 78 is spaced rearwardly from plate 100, being connected thereto by rod 78*c* so that the motor and turret shafts rotate, rather than the motor itself. Rods 92*c* and 94*c* extend slidably through openings 92*b* and 94*b* in end wall 88' and through openings 92*a* and 94*a* in blocks 92 and 94, the forward ends of the rods being fixedly mounted in openings 92*d* and 94*d* in plate 100. Thus, as stepper motor 68 is actuated to travel forwardly and rearwardly upon lead screw 70, inner carriage 42 moves, together with rods 92*c* and 94*c* and block 104 which is carried upon rod 92*c*, relative to outer carriage 40. The elements mounted upon plate 100, i.e., stepper motors 68 and 78, turret 80 and elements carried thereon, and switch 102 move relative to the outer carriage and to cutter mechanism 44. Lead screw 70 extends through opening 70' in plate 100 since the plate moves as screw 70 remains stationary.

Figure 7:
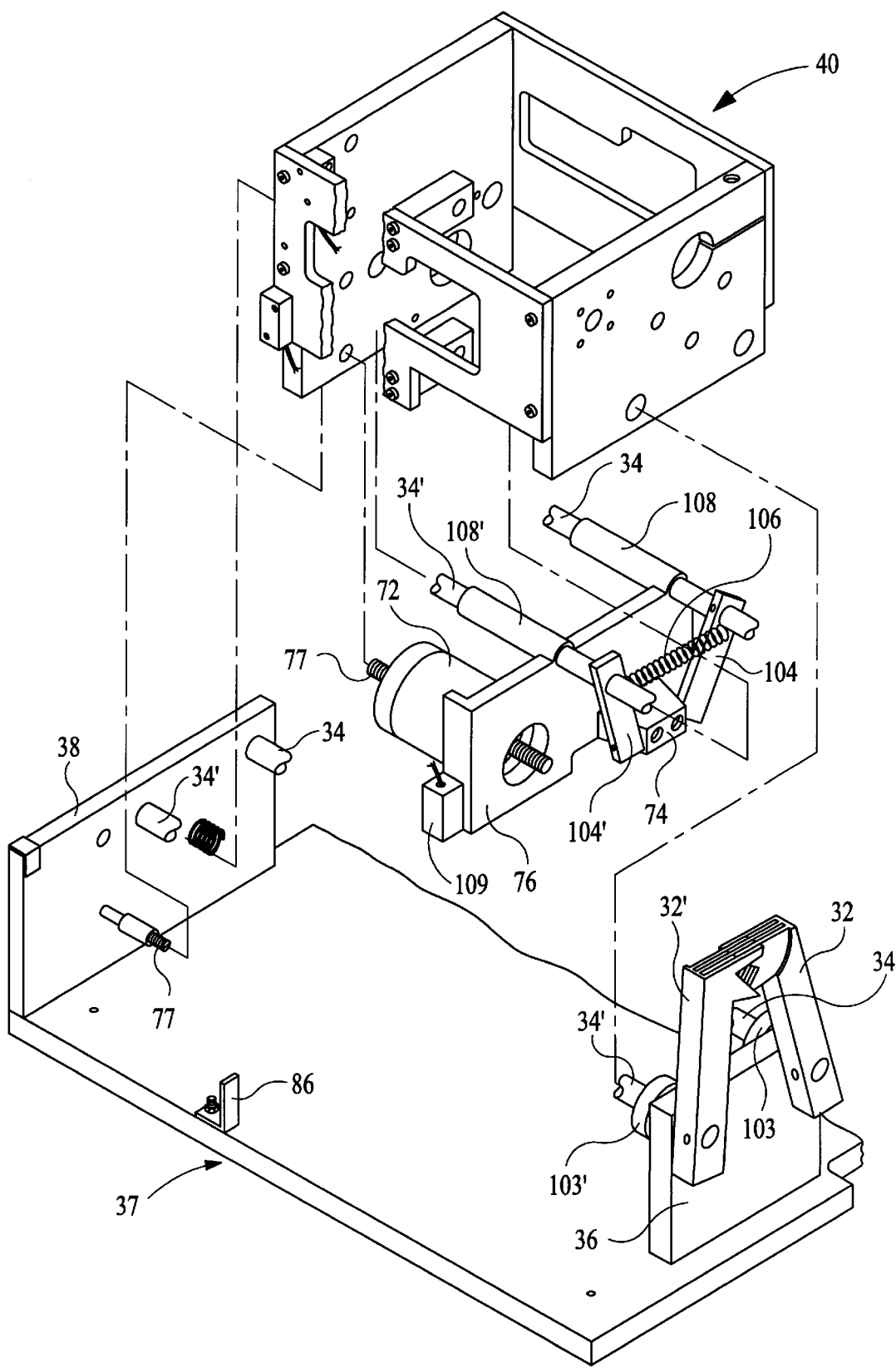

Fixed frame 37 and outer carriage 40 are shown in FIG. 7 in combination with the wire clamping elements. As previously mentioned, gripper members 32, 32' are fixedly mounted on the forward ends of rods 34, 34', respectively, with collars 103, 103' restraining axial movement of the rods. Thus, the V-shaped gripping jaws of gripper members 32, 32' are moved toward and away from one another as rods 34, 34' are rotated in opposite directions. Arms 104, 104' are fixedly connected to rods 34, 34', the lower ends of the arms being biased by spring 106 into contact with the tapered sides of wedge 74. As arms 104, 104' are rotated by forward and rear movement of wedge 74, rods 34, 34' are rotated to move gripper members 32, 32' into and out of engagement with a wire positioned therebetween. Wedge 74 is affixed to frame member 76, upon which stepper motor 72 is mounted, as previously mentioned. Rods 34, 34' extend slidably through sleeve portions 108, 108' which are integral with frame member 76. Limit switch 109, having rearwardly directed contact button 109*a* (FIGS. 2 and 3) is also carried by frame member 76. As stepper motor 72 is actuated to move in forward and rear directions on lead screw 77, frame member 76 and wedge 74 are likewise moved to actuate the gripping mechanism. With this arrangement, the distance of forward movement of the elements from an initial, "home" position, and thus the spacing of the gripping surfaces of gripper members 32, 32' at the forwardmost position of wedge 74, is commensurate with the number of steps which stepper motor 72 is indexed. The initial, rearmost position of frame member 76 is established by contact of rearwardly directed button 109*a* of contact switch 109 with bracket 86 on fixed frame 37.

Figure 8:
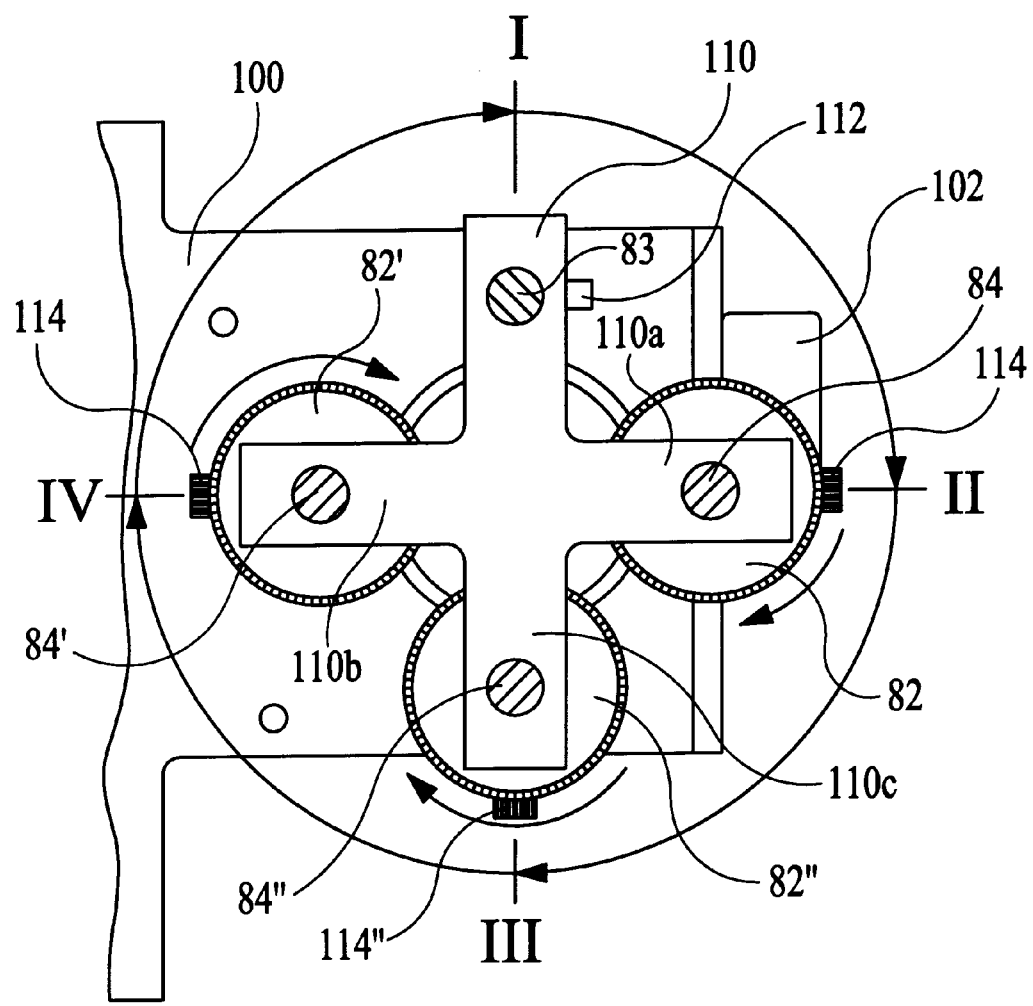
FIG. 8 is a front elevational view of certain elements.

Turret 80 is shown in enlarged, front elevation in FIG. 8, together with a fragment of plate 100. The turret includes four arms 110, 110*a*, 110*b*, and 110*c* at 90 degree intervals. Shaft 83 extends loosely through a passageway in arm 110, and threaded shafts 84, 84', and 84" extend through passageways in arms 110*a*, 110*b*, and 110*c*, respectively. Circular nuts 82, 82' and 82" are positioned in recesses in arms 110*a*, 110*b*, and 110*c*, respectively, in threaded engagement with shafts 84, 84' and 84", respectively. Thus, manual rotation of nuts 82, 82' and 82" moves shafts 84, 84', and 84" axially with respect to turret 80. Set screw 112 extends through one side of arm 110, into the passageway wherein shaft 83 is positioned, to permit axial adjustment of shaft 83 when screw 112 is backed off and to fix the axial position of shaft 83 when screw 112 is tightened against the shaft. This is considered a factory or technician-performed adjustment; that is, the axial position of shaft 83 is not intended to be changed by an operator of apparatus 10 and is considered to be fixed during normal cutting/stripping operations. Set screws 114, 114' and 114", on the other hand, have knurled heads for manual engagement by an operator to back off these screws as the operator turns nuts 82, 82' and 82" to adjust the axial positions of shafts 84, 84', and 84" to set up the apparatus for normal operation in the manner described later.

Referring now to FIGS. 9A and 9B, turret 80 is shown in its forward and rear positions, respectively, relative to elements of cutter mechanism 44. Forward and rear, linear movement of turret 80 is effected by operation of stepper motor 68 to travel upon lead screw 70, thereby moving inner carriage 42 upon which the turret is mounted. When apparatus 10 is ready to receive a workpiece (wire), inner carriage 42 is in its forward position of FIG. 9A wherein the forward end of fixed shaft 83 contacts the rear end of cutter mechanism shaft 54, moving member 50 to its forwardmost position and rotating arms 48, 48' to fully close blades 116, 116', i.e., to bring the cutting edges of the blades substantially into mutual contact. The wire is axially inserted, through shield opening 22 and the space between the gripping surfaces of gripper members 32, 32', which are initially in the open or most widely spaced position, until the terminal end of the wire contacts blades 116, 116'. The operator then presses cycling button 23 to begin the sequence of operations resulting in cutting and, if desired, stripping of a plurality of covering layers. During the ensuing sequence of operations, which takes place without further intervention by the operator, turret 80 is moved by stepper motor 68 to the rearward position of FIG. 9B, wherein shafts 83, 84, 84' and 84" are removed from clearance openings 96 to permit rotation of turret 80 by stepper motor 78.

Upon actuation, stepper motor 72 travels along lead screw 77 to move frame member 76 and wedge 74 forwardly from its initial position by a distance commensurate with a value previously entered into electronic memory by the operator. This value is selected as a function of the outside diameter of the wire so that the gripping force exerted by gripper members 32, 32' is sufficient to hold the wire during cutting/stripping operations, but is not an excessive force which might damage the wire. When the wire is securely clamped, stepper motor 68 is actuated to travel upon lead screw 70, moving inner carriage 42 and turret 80 from the position of FIG. 9A to that of FIG. 9B. Turret 80 is moved by a distance indicated by letter D, which is non-variable; that is, motor 68 is indexed by the same number of steps upon each actuation in both directions of movement. As turret 80 moves to its rearward position, the biasing force of spring 48a, urging the rollers on arms 48, 48' toward one another, causes member 50 to slide rearwardly on hollow shaft 46, thereby moving blades 116, 116' to the fully open position, spaced by a distance greater than the diameter of the clamped wire. Substantially simultaneously with actuation of stepper motor 68, motor 56 is actuated to rotate cutter mechanism 44.

With the elements in their positions of FIG. 9B, stepper motor 78 is actuated to rotate turret 80 by 90 degrees. Referring again to FIG. 8, turret 80 is movable in 90 degree increments to any of four positions. In the position shown, fixed shaft 83 is at position I. Assuming turret 80 rotates in a counterclockwise direction (as viewed in FIG. 8), shaft 83 will be in position IV after indexing once, and will be at positions III and II upon successive further indexings. The shaft in position I is axially aligned with shaft 54 of the cutting mechanism. With the blades in the open position, stepper motor 64 is actuated to travel on lead screw 66, moving outer carriage 40 forwardly upon rods 34, 34' by a distance which has been entered by the operator and stored in electronic memory as the length (from the terminal end of the clamped wire) of the first cut. Stepper motor 68 is then actuated again to move turret 80 (inner carriage 42) forwardly to the position of FIG. 9A. During such movement, shaft 84, which is now in position I, contacts the end of shaft 54, moving member 50 axially to pivot arms 48, 48' and move blades 116, 116' toward one another. When inner carriage 42 (turret 80) reaches its forwardmost position, the spacing of the blade cutting edges, i.e., the depth of the cut, is a function of the position of the front end of shaft 84. This position has been manually set by the operator, in a manner described later, and thus mechanically stored to produce the desired depth of cut.

Upon completion of the first cut, at the electronically stored length and mechanically stored depth, motor 56 is deactuated to stop rotation of the cutter mechanism. If desired, the blades may then be opened by a small amount to prevent scraping the central conductor or other wire layer as the severed slug is fully or partially pulled from its initial position; such opening is performed by rearward movement of inner carriage 42 by a portion of the total number of steps which stepper motor 68 is indexed to move the carriage to its terminal position. Stepper motor 64 is then actuated to move outer carriage 40 and the cutter mechanism in the rearward direction by a distance previously entered by the operator as the desired strip or pull length, if any. Stepper motor 68 is then actuated to move inner carriage 42 to its terminal rearward position, thereby fully opening blades 116, 116', and motor 56 is actuated to resume blade rotation. Outer carriage 40 is then moved forward by stepper motor 64 to position the blades at the second length of cut. Inner carriage 42 is moved forward, bringing shaft 84" into contact with shaft 54, thereby moving the blades radially to the second, mechanically stored depth of cut. After the final cut/pull operation, stepper motor 72 is returned to its terminal rear ("home") position, thereby releasing clamping members 32, 32' to permit withdrawal of wire 21. Motor 56 is again actuated to dislodge any debris from the blades as stepper motor 68 moves inner carriage 42 rearwardly to fully open the blades. Blade rotation is stopped and stepper motor 64 moves outer carriage 40 to its home position (if it is not already there after the final pull operation). Stepper motor 78 indexes turret 80 to its home position, with shaft 83 in position I, aligned with shaft 54.

The illustrated embodiment of apparatus 10 permits the operator to manually adjust the axial positions of three shafts, thereby mechanically storing the depths of three successive cuts to be made in the covering layers of the clamped wire, although it will be readily apparent that either more or less than three adjustable shafts may be provided to make the capabilities of the apparatus commensurate with its intended use. Manual adjustment of shafts 84, 84', 84" is effected while turret 80 is in its forward position (FIG. 9A), wherein the set screw and nut associated with the shaft in position I (FIG. 8) is manually accessible through opening 20. Turret 80 is moved to its rear position, rotationally indexed to position the desired shaft in position I, and returned to its forward position for manual adjustment by sequential actuation of stepper motors 68, 78 and 68 in response to a single keypad actuation, as explained later in more detail. After backing off the set screw of the shaft in position I, a gauge (e.g., a pre-stripped wire corresponding to the wire to be processed) is placed between the blade cutting edges and the nut is rotated manually in the appropriate direction, thereby moving (or allowing spring 48a to move) shaft 54 until the blade edges lightly contact (or are slightly spaced from) the gauge. The set screw is then advanced back into contact with the threaded shaft, fixing its axial position relative to turret 80 and mechanically storing the depth of cut produced by moving inner carriage 42 to its terminal forward position with the adjusted shaft in alignment with shaft 54.

It may be useful to note that the four described limit switches 98, 99, 102 and 109 are provided only to establish "home" positions of the four corresponding stepper motors, principally during set-up and power-up of apparatus 10. That is, they are not in use during the described sequence of wire processing operations. The home rotational position of turret 80, with fixed shaft 83 in position I is established by contact of protrusion 110a' on the rear side of turret arm 110a with contact button 102a, as shown in FIG. 2. It is also noted that springs 66a and 70a surround lead screws 66 and 70, respectively, to pre-load stepper motors 64 and 68 in accordance with conventional practice.

Figure 10:
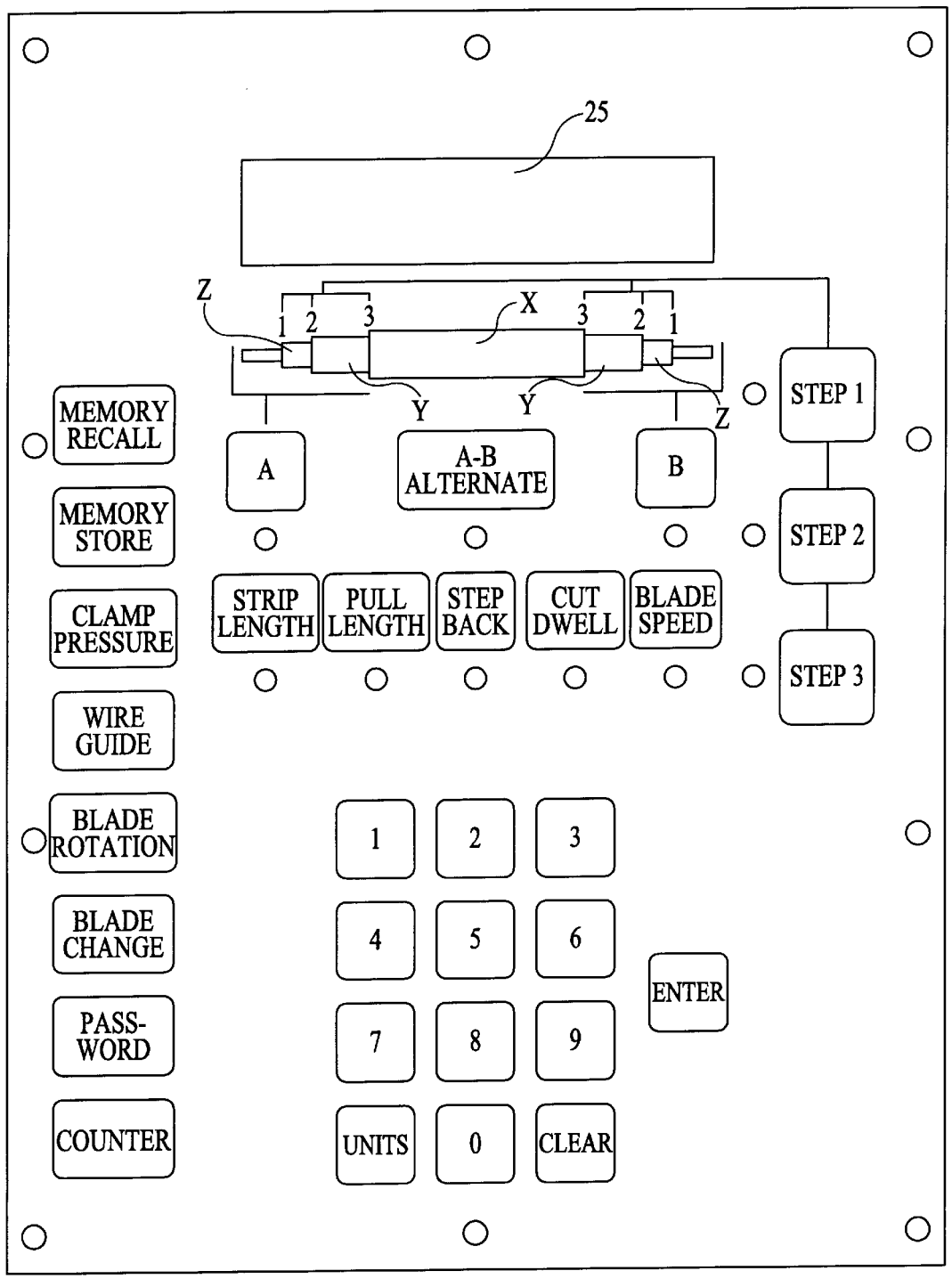
FIG. 10 is a plan view of an example of the keypad layout.

The steps performed by an operator in preparing the machine for performing a specific sequence of processing steps may be best understood by reference to the example of keyboard layout shown in FIG. 10. The layout preferably includes a pictorial example of a wire having three covering layers X, Y, and Z coaxially surrounding a central conductor. Opposite ends of the wire are referred to as A and B, with keys bearing these letters positioned in proximity to the pictured wire ends. The significance of this arrangement and the versatility which it adds to operation of apparatus 10 is explained later. To enter a program of values corresponding to successive operations to be carried out at each step, the operator presses the A button (or it is automatically activated at power-up) and then presses the "Step 1" button at the right side of the keypad. This actuates stepper motors 68, 78 and 68 in sequence to move inner carriage 42 to its rear position, rotate turret 80 to place arm 110a in position I, and move the inner carriage back to its forward position. Set screw 114 and nut 82 are now manually accessible through opening 20, and the position of shaft 84 is adjusted in the manner previously described to mechanically store the depth of the first cut. The operator then presses the "strip length" button and enters the value on the numeric portion of the keypad corresponding to the length of the first cut.

Values corresponding to the parameters represented by the buttons in the horizontal row under the AB buttons (or default values for these parameters) may then be sequentially entered by the operator for Step 1 of the processing operation. The "pull length" button represents the distance of linear travel of the blades in pulling or stripping the severed layer from its original position, the "step back" button corresponds to a distance of outward, radial travel of the blades after cutting to the pre-set depth and before beginning the pull/strip linear travel, the "cut dwell button sets the time for which the blades continue to rotate after reaching the cutting depth before rotation is stopped, and the "blade speed" button sets the speed of radial movement of the blades (i.e., the speed of stepper motor 68). After entering all Step 1 values, the operator then presses the "Step 2" button, which indexes turret 80 to permit manual adjustment of the depth of the second cut. The operator then proceeds to make the manual adjustments and keypad entries for the second and third steps of the operation and apparatus 10 is then ready, upon pressing cycling button 23, to perform the complete sequence of steps on a wire end.

It is sometimes required that the length(s) of cut(s), and possibly other parameters be different at opposite ends of a wire, although the depths of the cuts remains the same. In such situations, the operator may press key A and manually store the depths of cuts and electronically store other parameters in the manner just described. The operator then presses the B key and enters another sequence of values corresponding to the parameters indicated by the horizontal row of keys to be performed at end B. When successive processing operations are to be performed alternately according to programs A and B, the operator presses the "AB alternate" button before commencing the first operation. When the apparatus has completed the sequence of steps at end A, and the elements returned to their initial positions with the gripper members released, the wire may be withdrawn, reversed end-for-end, and reinserted until the terminal end of the wire contacts the blades. Upon the next actuation, the apparatus effects the processing operations previously entered and stored electronically for end B. The depths of the cuts, of course, are the same at both ends, corresponding to the mechanically stored values resulting from manual adjustment of the threaded shafts by the operator prior to initial actuation. It will be understood, of course, that the alternating (A and B) sets of parameters may be performed on the ends of two different wires, if desired, rather than on opposite ends of the same wire, provided that the depths of suts be the same in both sequences.

Further options are provided by the buttons in the vertical column on the left side of the keypad. Programs (e.g., relating to processing parameters for a particular type of wire) may be stored in and recalled from memory using the top two buttons. The "clamp pressure" button provides the operator with a plurality of choices of the distance of travel of stepper motor 72 to vary the spacing of the clamping jaws in the fully closed position. The "wire guide" button allows entry of values corresponding to the wire guide (a bushing having an opening corresponding to the diameter of the wire to be processed) which is installed at the front of cutting mechanism 44 as described in U.S. Pat. No. 4,993,147; entering this number may assist in locating a previously entered program for the type of wire used with this wire guide and/or may be electronically tied to the "clamp pressure" value to make this pressure correspond automatically to wire diameter. The "blade rotation" button permits the operator to select either clockwise or counterclockwise rotation of the blades. The "blade change" button is pushed to place the elements in position for installation of new blades in the manner of U.S. Pat. No. 4,993,147, and the "password" and "counter" buttons provide means for limiting access to the programming controls and for counting the number of processing operations, respectively.

From the foregoing it will be understood that the present invention provides a useful and versatile form of wire processing apparatus with means for electronically storing and automatically performing many processing functions and parameters, although entering a plurality of successive cutting depths is performed entirely manually and stored mechanically. Linear movement of inner carriage 42 between two distinct, forward and rear positions effects radial movement of the cutting blades to cutting depths determined by the operator-adjusted axial positions of a plurality of threaded shafts. The predetermined positions of the inner carriage are established by the number of steps by which stepper motor 68 is indexed, a value which is a permanent, non-adjustable and non-variable part of the permanently installed software of apparatus 10. Although manual setting of the elements which control the depths of cuts is more time-consuming than entering and storing values electronically, the manual settings are continuously variable, i.e., an analog operation, and not subject to preselected resolution limits of a digital procedure.

What is claimed is:

1. In wire processing apparatus having a cutter and cutter drive for effecting cuts through each of a plurality of covering layers on a central, elongated, filamentary member, and a length store which stores a plurality of values corresponding to the length from a terminal end of said filamentary member to the position of each of said cuts, the improvement comprising a system for manually adjusting and mechanically storing in a mechanical store a plurality of values corresponding to the depth of each of said cuts, said improvement comprising:

a) a housing having walls defining an enclosed space, said enclosed space containing said mechanical store;

b) said mechanical store comprising a plurality of individual mechanically adjustable elements movable to respective positions each corresponding to the depth of one of said cuts;

c) a drive for sequentially moving said individual elements to engage with the cutter drive and move said cutter drive to effect said depth of one of said cuts in response to movement of said individual elements to said respective positions; and d) an opening in one of said walls providing access to said mechanical store for manually induced movement of said individual elements to selectively adjust said respective positions.

2. The improvement of claim 1 wherein said walls include an upper wall wherein said opening is located for downward manual access to said mechanical store.

3. The improvement of claim 1 wherein said individual elements are shafts having respective, parallel longitudinal axes equally spaced radially from and parallel to a central axis, said individual elements being movable to said respective positions in directions parallel to said longitudinal axes.

4. The improvement of claim 3 wherein said shafts are threaded and further including a plurality of nuts threadedly engaged with respective ones of said shafts to effect axial movement of said shafts in response to manual rotation of said nuts.

5. The improvement of claim 4 and further including a turret upon which said shafts and nuts are mounted, said turret being rotatable about said central axis to sequentially place said longitudinal axes in position to engage and move said cutter drive.

6. The improvement of claim 5 and further including turret drive for moving said turret in a direction parallel to said central axis between predetermined, fixed, forward and rear positions.

7. The improvement of claim 6 wherein said turret drive comprise a motor and means for indexing said motor a fixed number of steps in each direction to effect said movement between said forward and rear positions.

8. The improvement of claim 1 wherein said apparatus includes an element drive for moving said individual elements linearly between predetermined, fixed, forward and rear positions to engage and move said cutter via said cutter drive.

9. The improvement of claim 8 wherein said element drive is an electrical motor.

10. The improvement of claim 9 wherein said apparatus includes an electronic store for electronically storing said plurality of values corresponding to respective lengths from said terminal end to each of said cuts.

11. Wire processing apparatus comprising:
 a) a fixed frame,
 b) a wire gripper mounted upon said frame
 c) a stepper motor actuable to move said gripper between a fixed, first position, spaced from said wire, and a variable second position, forcibly engaging and fixing the position of said wire;
 d) an indexer for indexing said stepper motor a number of steps defining the distance of movement of said gripper from said first to said second position; and
 e) a device for selectively varying said number of steps, thereby varying said distance of movement from said first to said second position and the force exerted by said gripper on said wire in said second position of said gripper.

12. The apparatus of claim 11 wherein said indexer comprises an electronic memory and said device comprises switches for selectively entering values into said memory commensurate with said number of steps.

13. The apparatus of claim 12 wherein said gripper comprises a pair of gripper members mounted for pivotal movement between said first and second positions.

14. The apparatus of claim 13 and further including a wedge member movable linearly by said stepper motor to move said gripper members between said first and second positions.

15. The apparatus of claim 12 and further including a pair of rods having parallel, longitudinal axes mounted upon said frame for rotation about said axes in response to actuation of said stepper motor.

16. The apparatus of claim 15 wherein said gripper comprises a pair of gripper members fixedly attached to respective ones of said rods for rotation therewith.

17. The apparatus of claim 16 and further including a wedge member and a frame member upon which both said stepper motor and said wedge member are mounted.

18. The apparatus of claim 17 and further including a lead screw axially and rotationally fixed with respect to said fixed frame and threadedly engaged with said stepper motor for linear movement of said frame member, and thereby said stepper motor and wedge member, in response to actuation of said stepper motor.

19. The apparatus of claim 18 wherein said frame member is mounted upon at least one of said rods for sliding movement thereon.

20. Wire processing apparatus for performing a plurality of sequential steps of each of first and second processing operations on first and second wire ends, respectively, said apparatus comprising:
 a) a gripper for releasably engaging and fixing the position of a wire;
 b) a cutter for performing said processing operations;
 c) a motive drive for effecting sequential movements of said cutter to perform said sequential steps;
 d) an electronic memory for actuating said motive drive to effect said sequential steps in accordance with values stored in said memory;
 e) an input device for selectively entering first and second pluralities of values, commensurate with said sequential steps of said first and second processing operations, respectively, into said memory; and
 f) a controller for said memory to actuate said motive drive to perform said first and second processing operations alternately upon successive actuations.

21. The apparatus of claim 20 and further including a manually operable actuator for initiating said processing operations.

22. The apparatus of claim 21 wherein said switches means include a keypad.

23. The apparatus of claim 22 wherein said keypad includes a pictorial representation of a wire having opposite, terminal ends and indicia relating one of said ends to said sequential steps of said first processing operation and the other of said ends to said sequential steps of said second processing operation.

24. The improvement of claim 7 wherein said motor is a stepper motor.

25. The improvement of claim 9 wherein said electrical motor is a stepper motor.

* * * * *